Patented Apr. 22, 1941

2,239,515

UNITED STATES PATENT OFFICE 2,239,515

ALKYL-ARALKYL ETHERS SUBSTITUTED BY HIGH MOLECULAR WEIGHT ALKYL GROUPS

Jeffrey Hobart Bartlett, Cranford, N. J., and Melvin F. Fincke, New York, N. Y., assignors to Standard Oil Development Company, a corporation of Delaware No Drawing. Application August 21, 1936, Serial No. 97,180

3 Claims. (Cl. 260—611)

The present invention deals with a new group of wax modifying agents, and more specifically to the process of producing such materials.

It has been found that valuable wax modifying agents can be prepared by the condensation of paraffinic materials with aliphatic ethers containing aromatic substituent groups. Paraffin wax is perhaps the cheapest and most readily available paraffinic material and it may be rendered suitable for condensation by chlorination; for example, by the direct addition of chlorine to the extent of 10–15% by weight. Instead of the chlorinated wax, however, a dehydrogenated wax may be used and may be obtained from the chlorinated wax, that is, by dechlorination by heating for a short time to a high temperature. Similar dehydrogenated waxes may be produced by other dehydrogenation processes, but the reaction should be accomplished with a minimum of cracking and with the least possible disturbance of the original carbon structure. While wax is preferred, other paraffinic material can likewise be used, such as aliphatic organic compounds having a relatively long chain structure. Alcohols with 10 to 20 carbon atoms may be chlorinated directly or otherwise rendered unsaturated if the materials are originally saturated, and the condensation may be carried out in the same way as with modified hydrocarbon waxes. Fatty acids with long chains may be used, and unsaturated acids such as oleic acid are particularly desirable. These materials may be used as such, that is to say, in the form of the unsaturated acid or in the form of the acid chlorides or when esterified with a suitable alcohol, preferably one of low molecular weight.

The condensable wax derivative of any of the types disclosed in the previous paragraphs is combined with the second reactant, namely the aliphatic ether containing a cyclic substituent group. By these terms it is intended to describe compounds of the general class of the benzyl ethers, for example, methyl- or ethyl- benzyl ether or dibenzyl ether, as well as ethers of naphthenic or hydroaromatic hydrocarbons with or without aliphatic side chains attached to the cyclic radical. These materials have the following general structure:

R—O—(CH₂)ₙR'

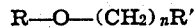

in which R is a hydrocarbon radical, R' is a cyclic radical and n is an integer. It will be noted, therefore, that these ethers are aliphatic since the oxygen group is joined directly to aliphatic carbon atoms and the group is therefore distinguished from the true aromatic ethers such as phenyl or naphthyl ether. The radical R may of course be R'(CH₂)ₙ— if desired as in dibenzyl ether. Likewise ethers of the following formula may be used:

R—O—C(R')(R")(R''')

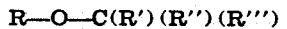

where R is a hydrocarbon radical, R' is a cyclic or aromatic radical and R" and R''' are hydrogen atoms, or hydrocarbon radicals either cyclic or open chain.

Beside benzyl ethers which are the most readily available materials of the class may be included its homologues such as the ethers of tolyl carbinols; also the ethers of phenyl-substituted propyl alcohols, such as hydrocinamyl ether or ethers of phenyl-substituted butyl alcohols and the like. Similar ethers prepared from polysubstituted ethers are also useful such as the ethers of diphenyl- or triphenyl-substituted methyl alcohol or other carbinols or of the other corresponding alcohols, and if desired the phenyl groups may contain additional substituent hydroxyl or alkyl groups. In place of phenyl substituted aliphatic ethers, the corresponding naphthyl substituted aliphatic ethers can be employed such as naphthyl ethyl, or naphthyl methyl ether or the ethers of alcohol containing other aromatic groups. The evidence indicates that this entire group of aromatic substituted aliphatic ethers are adapted to the present process.

While it has been found that the oxy-ethers are the most desirable compounds for use in the above reaction, it has also been found that the thio-ethers may be used. As stated above, they are far from being as satisfactory as the ordinary oxy-ethers, however, not being as potent modifiers and, further, because the reaction by which they are produced does not proceed smoothly or give good yields.

There may be a rather wide variation in the proportion of the ingredients of the two types mentioned above, but in general the amount of ether is much less than that of the paraffinic material; for example, it is preferably in proportion from 10 to about 20% by weight of the paraffinic material.

The reaction between the paraffinic material and the said ether is brought about by means of catalysts preferably of the type of aluminum chloride, zinc chloride, boron fluoride, titanium fluoride and other active halide catalysts and, while large amounts can be used, that is to say approximately equimol quantities of paraffinic material and aluminum chloride, it has also been found that relatively small amounts of the order of 3–5% can be used effectively. The reaction can be brought about in the presence of a diluent such as naphtha or carbon disulfide, but diluents are not required. The temperature varies somewhat with the particular ingredients and the catalyst employed, in the range from room temperature to about 300° F. The time of reaction is usually from 2–10 hours at the end of which catalytic sludge is hydrolyzed by the addition of an alcohol, water, alkali or acid. The product is then recovered by distilling off the light diluents and the lower boiling materials which do not possess wax-modifying properties. The material may then be washed lightly with acid or treated with small amounts of clay to improve its color and general appearance.

The above disclosed materials are condensation products or polymers of molecular weights from 500 to 1,500 or higher and are ordinarily employed in proportions from about 0.1 to 5% in waxy oils, the optimum amount varying considerably with the particular ingredients from which the material is produced and the specific reaction conditions. If the procedure is carried out according to the above description it is possible to reduce the pour point of waxy oils by the addition of the amount stated by from 10–50° F. It is also possible to employ these materials as an aid to the separation of wax from waxy oils. In this instance about the same amount as indicated before is used along with a suitable diluent such as naphtha, benzol and acetone mixtures or mixtures of naphtha with alcohols, ketones and various other known dewaxing solvents. The presence of these materials enables the operator to chill the diluted waxy mixture at an extremely high rate and still obtain the wax in a form permitting rapid settling, filtration or centrifugation. Not only does the wax separate more rapidly, but there is also a smaller bulk so that the wax recovered contains a smaller amount of residual oil.

As an example of the reaction by which the improved wax modifiers are produced, the following may be considered: To 150 parts of chlorinated paraffin wax (12% chlorine by weight) is added 22 parts of dibenzyl ether. When the mixture is complete, 6 parts of aluminum chloride is gradually added while heating from room temperature to about 250° F. The mass is continually stirred during the heating which occupies a period of about 5 hours and is continued for about one-half an hour after attaining the temperature of 250° F. The reaction mass is then cooled and settled. The sludge is hydrolyzed by the addition of soda and isopropyl alcohol and the oily product recovered.

The product remaining after the distillation of the low boiling constituents amounts to about 10% on the total reactants used and consisted of a viscous oil of good color and appearance. When 2% of this oil is added to a Pennsylvania 150 neutral oil which has an original pour point of 30° F., it was found that the pour point is reduced to —20° F.

In the following claims the term "ether" is used generically to denote both thio and oxy ethers, while the oxygen containing ether is described as an "oxy ether." The invention is not to be limited to any theory of the mechanism of the reaction nor to any particular ingredients, reaction conditions, additions, catalysts, or the like, but only to the following claims in which it is desired to claim all novelty inherent in the invention.

We claim:

1. As an improved wax modifier, a product having the general formula $R-O(CH_2)_n-ArR'$, in which R is an alkyl radical, $n$ is an integer, Ar is an aromatic radical and R' represents at least one aliphatic hydrocarbon chain of at least 10 carbon atoms.

2. Product according to claim 1 in which the alkyl group R has 1 to 2 carbon atoms and Ar is a benzene ring.

3. As an improved wax modifier, methyl benzyl ether having at least one alkyl group of at least 10 carbon atoms attached to the benzene ring.

J. HOBART BARTLETT.
MELVIN F. FINCKE.